United States Patent [19]

Loy

[11] Patent Number: 4,461,363

[45] Date of Patent: Jul. 24, 1984

[54] HIGH-SPEED CAPACITIVE WEIGHING METHOD AND APPARATUS

[75] Inventor: Nicholas J. Loy, Clifton, N.J.

[73] Assignee: Hoffmann-La Roche Inc., Nutley, N.J.

[21] Appl. No.: 401,680

[22] Filed: Jul. 26, 1982

[51] Int. Cl.³ .................. G01G 3/14; G01G 11/16; G01G 17/00

[52] U.S. Cl. ..................... 177/1; 177/16; 177/210 C

[58] Field of Search .......... 177/210 C, 16, 1; 194/100 A; 324/61 R

[56] References Cited

U.S. PATENT DOCUMENTS 3,979,581  9/1976  Reuland .............. 177/210 C

Primary Examiner—Harry E. Moose, Jr.
Assistant Examiner—Patrick W. Foster
Attorney, Agent, or Firm—Jon S. Saxe; Bernard S. Leon; Alan R. Stempel

[57] ABSTRACT

The mass of an object dropped through a capacitive sensing transducer having a pair of spaced plates is determined independently of the spatial orientation of the object as it passes through the transducer, and independently of whether the object is entirely within the transducer at any instant. The transducer generates an output proportional to the instantaneous change in capacitance between the spaced plates caused by the sample passing therethrough. When the sample is a powder, the transducer output is integrated, and a correction factor is subtracted from the integral for correcting for temperature drift and for accumulation of minute particles of the powder on the plates. The spaced plates can be formed in a substantially 90° twist; or, the transducer may be in the form of a plurality of pairs of spaced plates, each pair being oriented at a different angle with respect to the path of a sample through the transducer.

38 Claims, 12 Drawing Figures

HIGH-SPEED CAPACITIVE WEIGHING METHOD AND APPARATUS

TECHNICAL FIELD OF THE INVENTION

The present invention relates to a method of and apparatus for the capacitive weighing of an object as it passes between the plates of a capacitor.

BACKGROUND ART

Traditional high-speed weighing devices, such as linear variable differential transformers and piezoelectric strain-gauge and force-restoration devices require contact with the substance to be weighed. They also require a vibration-free environment. These requirements are sometimes inconvenient to meet, and are avoided by capacitive weighing methods which are a relatively recent development. Unlike conventional weighing devices, capacitive weighing does not measure force; but rather, it measures the product of mass and other electrical constants of the material to be weighed. The theory is based on the change in capacitance effected by placing a small object in the space between the plates of a parallel-plate capacitor, the capacitance changing in accordance with the formula:

$$\Delta C = [m(D-1)]/\rho$$

where $\Delta C$ is the change in capacitance, $m$ is the mass of the object, $D$ is the dielectric constant of the object, and $\rho$ is its density.

U.S. Pat. No. 4,223,751 discloses capacitive weighing apparatus for determining whether the mass of a capsule lies within a predetermined range. The apparatus includes a capacitive sensing transducer having a pair of parallel plates to which a rapidly changing electric field is applied. A non-conductive tube placed between the plates defines a conduit for guiding capsules into the region between the plates. The tube thus establishes the attitude of the capsules as they are pneumatically propelled through the plates in such a way that only one capsule passes between the plates at any one time. The output of an amplifier electronically coupled to the plates is proportional to capacitive changes produced by the passage of a capsule. Electrical circuitry responsive to the output of the amplifier determines whether the mass of the capsule is within a predetermined range. Thus, the weighing apparatus of this patent is limited to weighing samples having a defined envelope presented to the apparatus in a predetermined attitude.

U.S. Pat. No. 3,979,581 discloses a capacitive system in which material to be weighed is moved along a predetermined path to a weighing station, where the material lies in a capacitive cell forming part of a high-frequency oscillator circuit. When the material is within the capacitive cell, its capacitance and the attenuation of the high-frequency oscillator circuit at resonance are both measured. The mass of the material in the capacitive cell is calculated by means of an nth-degree polynomial, whose constants are stored in a computer, and whose variables are the signals corresponding to the resonant attenuation and capacitance. The computed mass value is used to control the mass of the material moving along the path.

The known prior art is limited to weighing samples whose presence in a capacitive cell produces a substantial change in capacitance of the cell because of the relatively large signal-to-noise ratio produced. Where the sample is so small that it produces a relatively small change in capacitance, the noise component in the output of the transducer becomes significant; and thus, spurious results are likely when the sample has a relatively small mass. In addition, the prior art requires the presentation of bounded samples in a predetermined attitude within the transducer. As a consequence, conventional weighing apparatus is unreliable for making dynamic measurements of small amounts of powdered samples which flow through a transducer and have no fixed boundary or attitude relative to the transducer, or which may not be entirely within the transducer at any time during transit therethrough.

It is, therefore, an object of the present invention to provide a new and improved capacitive weighing apparatus which overcomes or substantially ameliorates the above-described problems with conventional capacitive weighing apparatus.

Still another object of the present invention is to provide an improved capacitive weighing device which provides correction for particles of powdered samples which accumulate on the transducer over time, and for temperature drift of the capacitive weighing device over time.

BRIEF SUMMARY OF THE INVENTION

According to the present invention, a capacitive weighing device includes a capacitive sensing transducer having a pair of spaced plates for generating a time-variable signal proportional to the instantaneous change in capacitance caused by the passage of a sample through the transducer. Calculating means responsive to the time-variable signal integrates the same over a predetermined interval of time to provide a representation of the mass of the sample. Such representation will be independent of whether the sample is totally within the transducer at any instant and of the spatial distribution of the sample as it passes through the transducer. Thus, this aspect of the invention is suitable for weighing unbounded samples, such as powders.

The transducer includes a measuring capacitor and a reference capacitor. The reference capacitor maintains a baseline reference which is stable relative to environmental conditions such as temperature and humidity.

The calculating means may include correction means responsive to the time-variable signal at the limits of integration for producing a representation of the magnitude of accumulation of particles of samples on the plates of the transducer. This aspect of the invention is particularly well suited to weighing powdered samples. Delay means may be provided which are responsive to the time-variable signal for producing a delayed signal that is a substantial replica of the time-variable signal. A suitable delay means is a phase-linear filter, such as a Bessel filter. The undelayed signal is sampled to determine if an event of interest (namely, the entrance into the cell of the substance to be weighed) has occurred. This determines whether the signal is noise or data, thus decreasing the susceptibility of the apparatus to noise and permitting measurement of minute samples.

Once an event of interest is detected, the delayed version of the signal may be sampled in order to obtain the offset or baseline signal just prior to the event. The delay also provides filtering of the signal to improve the signal to noise ratio; thus, the delay is also sampled to obtain, with appropriate computations, the weight of the sample. For example, the delayed signal may be integrated over a predetermined period to provide a representation of the mass of the sample.

One plate of the capacitive sensing transducer can be formed of two interdigitated portions, whereby the passage of a sample develops two time-variable signals that are identical in shape, but delayed in time. In such case, the device can also include correlator means for generating a delayed-magnitude signal indicative of the magnitude of the delay between the pair of time-variable signals, the delayed-magnitude signal being provided to the calculating means for establishing the instant in time when the integration process is to begin.

Alternately, the pair of spaced plates of the transducer can be formed in a substantially 90° twist. As a still further modification, the capacitive sensing transducer can include a plurality of pairs of spaced plates, each oriented at different angles with respect to the path travelled by a sample. With these arrangements, the attitude sensitivity of the transducer is reduced.

BRIEF DESCRIPTION OF THE DRAWINGS

Embodiments of the present invention are shown by way of example in the accompanying drawings, wherein.

DETAILED DESCRIPTION OF THE INVENTION

Figure 1:
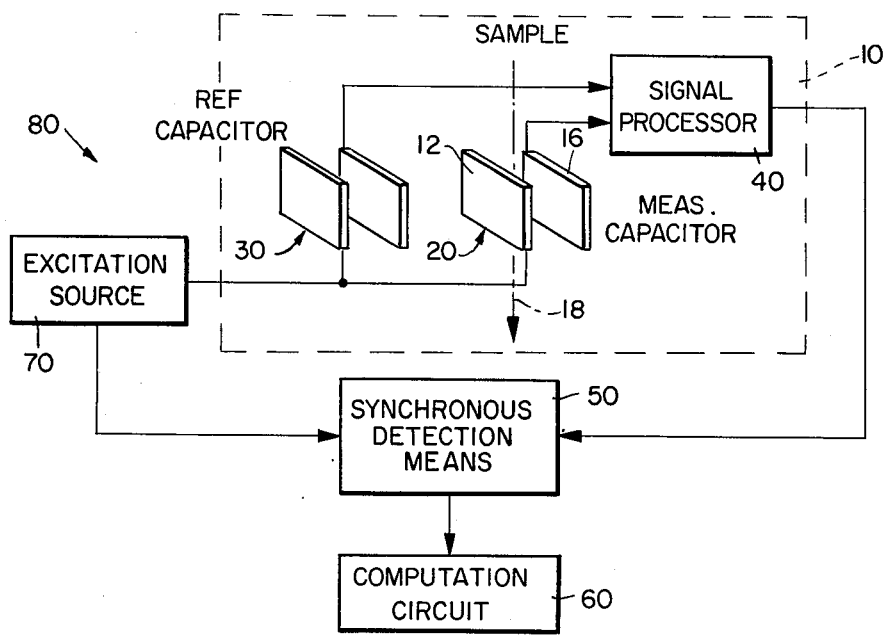
FIG. 1 is a schematic diagram showing a capacitive weighing apparatus according to the present invention.

Referring now to FIG. 1, reference numeral 80 designates capacitative weighing apparatus according to the present invention which includes excitation source 70 that provides a high-frequency modulated excitation signal (e.g., a 10 MHz carrier that may be 100% modulated at 200 Hz) to capacitive sensing transducer 10, which includes measuring capacitor 20, reference capacitor 30, and signal processor 40. The measuring and reference capacitors are oriented side-by-side; and a sample, which may be volume-bounded (i.e., a capsule or tablet), or unbounded (i.e., a slug of powdered material) is passed between plates 12, 16 of the measuring capacitor, following the path 18. The reference capacitor remains free of samples and thus provides a reference to which the measuring capacitor can be compared.

The outputs of the measuring and reference capacitors 20 and 30 are fed into signal processor 40, the output of which is a signal proportional to the difference between the capacitances of the two capacitors. When a sample is absent from the measuring capacitive cell, the capacitances of both capacitors will be the same and the output of transducer 10 will be zero. However, when a sample is present in the measuring capacitive cell, the output of transducer 10 will be proportional to the difference in capacitance between measuring capacitor 20 and reference capacitor 30, and therefore to the mass of the sample within the capacitive cell.

The output of transducer 10 is applied to synchronous detection means 50, that extracts a waveform out of the data and noise which makes up the signal from transducer 10. Excitation source 70 provides a synchronizing reference signal to synchronous detection means 50, whose output is applied to computation circuit 60, which computes the mass of the sample to be weighed in the manner described below.

Figure 2A:
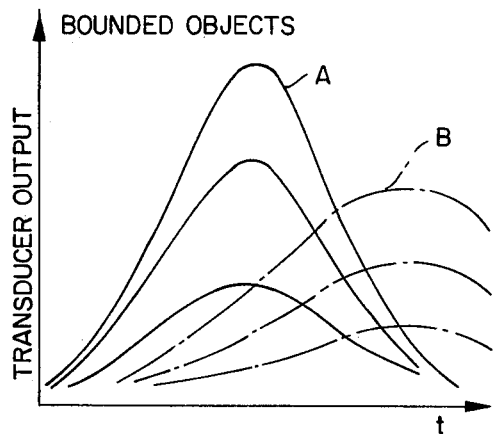
FIG. 2A illustrates two different families of curves representing the output of the transducer versus time for two different orientations of a bounded sample as it passes through the measuring cell.

For bounded objects, such as tablets or capsules having predetermined shapes and having a given attitude as they pass through cell 20, the output of transducer 10 of FIG. 1 will correspond to the family of curves A shown in solid lines in FIG. 2A. Each curve of the family of curves corresponds to a bounded object having a given attitude but a different mass. The family of curves B shown in chain lines in FIG. 2A corresponds to bounded objects of differing masses having a predetermined attitude different form the attitude of the objects in Curve A.

Figure 2B:
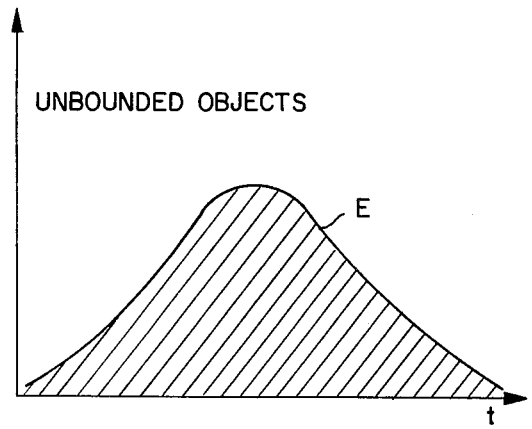
FIG. 2B illustrates an output of the transducer versus time for an unbounded sample.

Unbounded objects such as powders dropped through capacitive cell 20 cause transducer 10 of FIG. 1 to produce an output like that shown by curve E in FIG. 2B. Because a slug of powder is unbounded, consecutive slugs will have differently shaped distributions within the cell. Similarly, if the attitude of bounded objects is uncontrolled, the distribution of successive objects through cell 20 will vary.

To determine the change in capacitance of the measuring capacitor as a powder is dropped through the capacitive measuring cell 20, the curve shown in FIG. 2B is integrated between predetermined limits which can be determined experimentally. This integration method may also be used for bounded objects. Alternatively, for solid objects having controlled, constant attitudes, the peak value of the curve can be used to determine the mass of the object. Both the integration method and the peak-value method are discussed more fully below.

Figure 3:
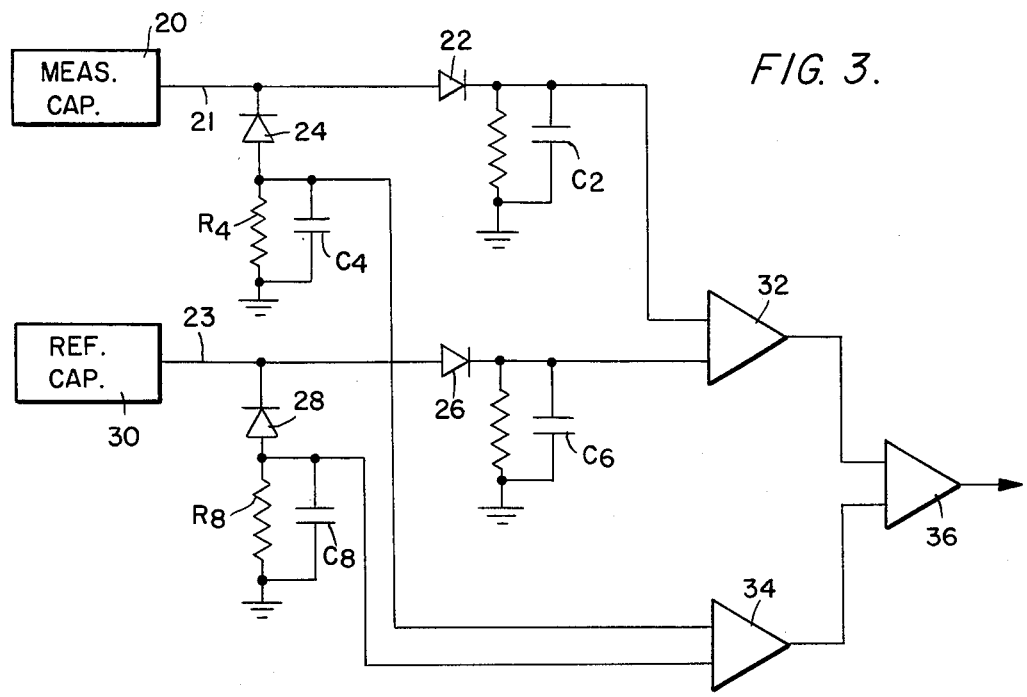
FIG. 3 is a circuit diagram of the signal processor shown in the block diagram of FIG. 1.

FIG. 3 illustrates the preferred form of signal processor 40. The output of the measuring capacitor 20 is fed along line 21 to diode 22 and to diode 24. The output of the reference capacitor is fed along line 23 to diode 26 and to diode 28. During the positive half cycle of the excitation, diodes 22 and 26 are forward-biased and diodes 24 and 28 are reverse-biased. During the negative half cycle, the biases are changed. Thus, diode 22 passes positive current from the measuring capacitor 20, and diode 24 passes negative current from the measuring capacitor 20. Diode 26 passes positive current from the reference capacitor 30, and diode 28 passes negative current from the reference capacitor 30. The positive currents from the measuring capacitor and the reference capacitor are therefore fed into difference amplifier 32, while the negative currents of measuring capacitor 10 and reference capacitor 40 are fed into difference amplifier 34. The outputs of difference amplifiers 32 and 34 are fed into difference amplifier 36. The output of difference amplifier 36 is a time-variable signal whose amplitude is proportional to the instantaneous capacitive difference between the measuring capacitor and the reference capacitor. When no material is present in measuring capacitive cell 20, the currents passing through the measuring capacitor and reference capacitors are identical, because the measuring and reference capacitors are matched; and the outputs of all three difference amplifiers will equal zero. When material is present within measuring capacitive cell 20, more current passes through the measuring capacitor than through the reference capacitor, causing the output of difference amplifier 32 to be positive, the output of difference amplifier 34 to be negative, and the output of difference amplifier 36 to be the difference between the outputs of difference amplifiers 32 and 34.

Because the difference signal from the capacitor is of a very low level and is often buried in noise, a synchronous detector is used to recover the signal and reject the noise. A suitable synchronous detector is a lock-in amplifier, which responds to odd harmonics, weighed according to the Fourier transform coefficients of a square wave. An external filter is provided to filter out the third and fifth, etc. harmonics produced by this signal distortion. The filter and signal processor cause an uncertainty in the phase angle of the signal and the phase angle must be set correctly, or the performance of the lock-in amplifier will be seriously degraded. The solution is to use a vectored heterodyne lock-in amplifier which is a commercially available device well known to those skilled in the art.

Critical phase settings can be avoided by employing two lock-in detectors which are operated 90° out of phase with each other, with one detector representing the sine and the other the cosine function, with the signal from each detector being squared and summed, and the square root of the total calculated. This allows the output of the lock-in to be independent of phase, since the sum of sine squared and cosine squared is always equal to one.

Figure 4:
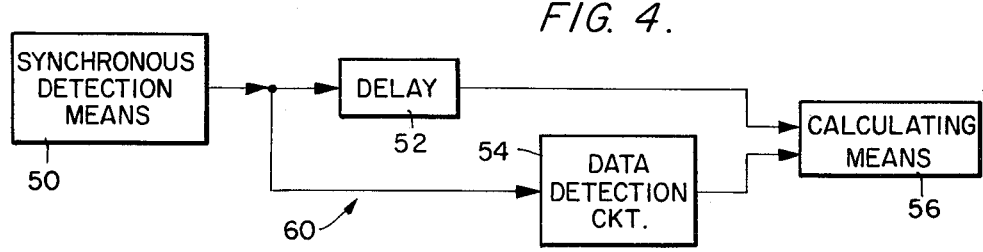
FIG. 4 is a schematic diagram showing a computation circuit of the present invention.

FIG. 4 shows details of computation circuit 60 which comprises synchronous detection means 50, delay circuit 52, data detecting means 54, and calculating means 56. The output of synchronous detection means 50 is fed into delay circuit 52 which provides a substantially duplicate, but delayed, version of the output of means 50 to calculating means 56. The output of means 50 is also applied to data detecting means 54 which is operable, as described below, to detect the instant at which the rate of increase of the time-variable signal produced by the synchronous detection means exceeds a predetermined threshold value in the manner described below.

Data detecting means 54 operates as a sample-and-hold circuit, taking samples of the output of synchronous detection means 50 at regular intervals of time, and performing a comparison between the current sample and the previous sample. If the current sample does not exceed the previous sample by a predetermined amount, the previous sample is discarded, and the next sample is taken after a suitable interval of time. If the current sample does exceed the previous sample, then sampling circuit 54 assumes that an event of interest has occurred, namely the entry of an object into the measuring capacitor. Circuit 54 responds to this condition by enabling calculating means 56 which determines either the peak value of the delayed signal applied thereto by delay circuit 52, or calculates the integral of the delayed signal, depending on whether bounded or unbounded objects are being weighed.

If bounded objects are involved, the peak value can be detected by calculating means 56 in a manner similar to the manner in which an event is detected by circuit 54. Preferably, calculating means 56 is a microprocessor programmed to effect the sampling, storing, and comparing of data.

Figure 5:
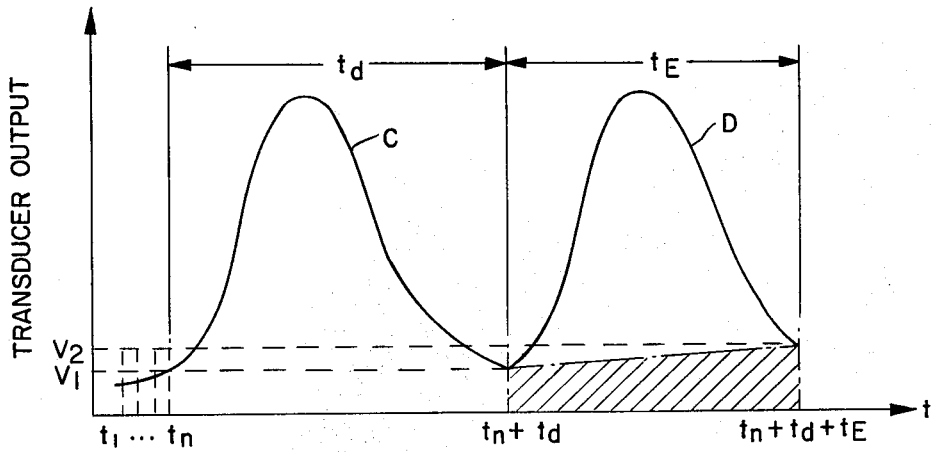
FIG. 5 illustrates the operation of the correction means of the present invention.

Of particular interest is the case when the objects are unbounded and an integration operation must be performed to obtain the mass of each object. In such case, means 56 is effective to establish the baseline for the integration and thus improve the accuracy with which the mass of an unbounded object is measured. Referring now to FIG. 5, curve C represents the real-time output of means 50 in response to the passage of a slug of powder through cell 20; and curve D represents the delayed output of delay 52. Circuit 54 is shown to have commenced sampling the real-time curve C at time $t_f$ for the purpose of detecting an event; and to have detected the occurrence of an event at time $t_n$. If the delay time of delay 52 is $t_d$, means 56 is enabled at $t_n+t_d$ as shown in FIG. 5, the value of the input to means 56 at that instant being the initial baseline value $V_1$. The final baseline value $V_2$ is found by sampling the magnitude of the delayed signal produced by delay 52 at time $t_n+t_d+t_E$, where $t_E$ is the mean time of flight of a slug of powder through cell 20, and is determined empirically. The final baseline value $V_2$ will exceed the initial baseline value $V_1$ when particles from a slug of powder passing through the plates of capacitor 20 deposit on the plates. Variations in baseline values may also occur because of variations of the capacitance in the cell as a result of temperature variations.

Calculating means 56 (FIG. 7) is operative to integrate curve D over the interval $T_E$, and to subtract the integral of the curve defined by the baseline established by the values $V_2$ and $V_1$. In practice, means 56 is a digital computer which is enabled by a signal from data detecting means 54. When enabled, means 56 samples the time-variable signal D at a frequency at least twice the highest-frequency component in the signal-producing train of pulses, whose amplitudes are a measure of the instantaneous value of signal D. An analog-to-digital converter (not shown) converts each pulse to a number whose magnitude is proportional to the amplitude of the pulse, and these numbers are accumulated in the computer. Thus, the total accumulated in the interval of time $T_E$ is representative of the area under curve D (i.e., the definite integral).

Baseline correction is carried out by first averaging the values $V_1$ and $V_2$, and multiplying the average by a scaled value of $T_E$ to produce a number representative of the area of the cross-hatched region in FIG. 5, such number then being subtracted from the number representative of the area under curve D. The result is a number representative of the mass of the slug passing through the transducer and producing curve D. The actual mass is obtained from a look-up table whose values are obtained experimentally.

The above calculation of the integral of curve D and subtraction of the integral of the curve defined by the baseline will yield a representation of the mass of the sample where the sample is either a powder or a bounded object. In addition, the attitude of the sample need not be held constant.

Alternatively, when bounded samples are involved instead of powders, and the attitude is controlled, the peak value of curve D is obtained by a process of sampling the curve, saving the sample, comparing it with the next sample, and repeating the sequence until the next sample has a value less than the previous value. This permits the peak values of curve D to be obtained. The average of the two baseline values $V_1$ and $V_2$ is subtracted from the peak value of the signal to give a value which is then used by the calculating means 56 to obtain the mass of the substance being weighed.

Figure 8:
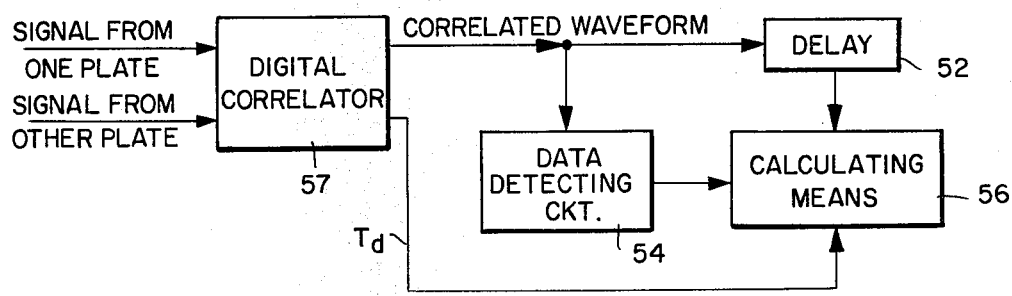
FIG. 8 is a block diagram of a correlator receiving the output of the interdigitated capacitor of FIG. 7.
Figure 6:
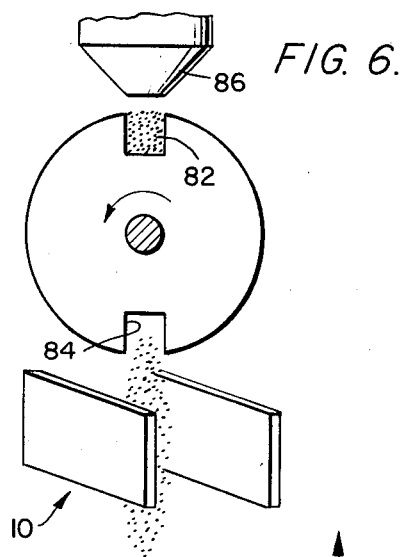
FIG. 6 is a perspective and schematic view of a measuring capacitive cell and an example of an apparatus for propelling a measured amount of powdered substance through the measuring cell.

FIG. 6 is a schematic illustration of a Perry powder machine, designated by reference numeral 80, for injecting exact slugs of powder through measuring capacitive cell 20. Powder is loaded into the Perry powder machine via hopper 86. Indentations 82 and 84 are formed in the surface of the powder machine 80 for receiving powder from the hopper 86. Vacuum means (not shown) hold the powder in the indentations 82 and 84 after it has been loaded therein. The powder is expelled by air pressure out of the indentations 82 and 84 when a respective indentation reaches the bottom of its cycle, just above the measuring capacitive cell 20. One characteristic of such a Perry powder machine 80 is that the powder will be expelled out of the indentations 82 and 84 at variable speeds. This creates a problem when the method of computing the mass of powder which has passed through the cell is to calculate the normalized integral of the change in capacitance of the measuring capacitive cell 20 over time. This method is used because of the physical relationship that $$\text{mass} = \beta/t_1 \int_{t=0}^{t=t_1} \Delta C \, dt$$

where $\beta$ is a conversion factor, $\Delta C$ is the change in the capacitance, and t is the time. Computing the normalized integral of the change in capacitance over time is advantageous in that it removes the constraint that all the sample must be present in the capacitive cell at the same time. However, underlying the method is the assumption that the average time of flight through the cell of a particle is the same for each slug or dose of powder. This assumption is valid only if the powder is reasonably dense, consistent in particle size distribution, flows well, and is dropped from the same height each time. The particle size is not critical, so long as the shape of the particle cloud is not significantly altered or the particles are not extremely small so as to prevent flow. It is clear that these conditions cannot be met in all cases. In addition, for a Perry powder machine 80, as described above in connection with FIG. 8, the powder is expelled from the machine at variable speeds, and therefore, the assumption that the mean time of flight through the capacitive cell 20 is the same for each slug or dose of powder is not valid.

In cases where the average time of flight is variable, the actual time of flight of the powder must be detected in some manner. One way of estimating the mean time of flight of the powder through the cell 20 is to place a detecting capacitor directly above or below the measuring capacitive cell. As powder enters the capacitive cell, the leading edge of the slug will turn-on the first detecting capacitor, and, as the leading edge of the slug leaves the capacitive cell 10, the lower detecting capacitor will be turned on. The delay between turning on the first detecting capacitor and the second detecting capacitor is used to determine the average time of flight for each particle in a slug of powder.

Figure 7:
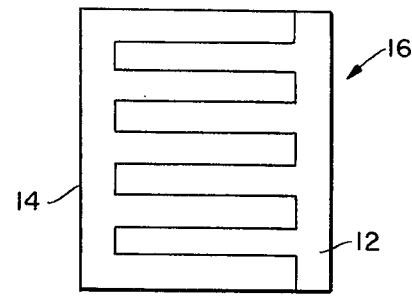
FIG. 7 is a schematic view of the interdigitated capacitive plate of the present invention.
Figure 9:
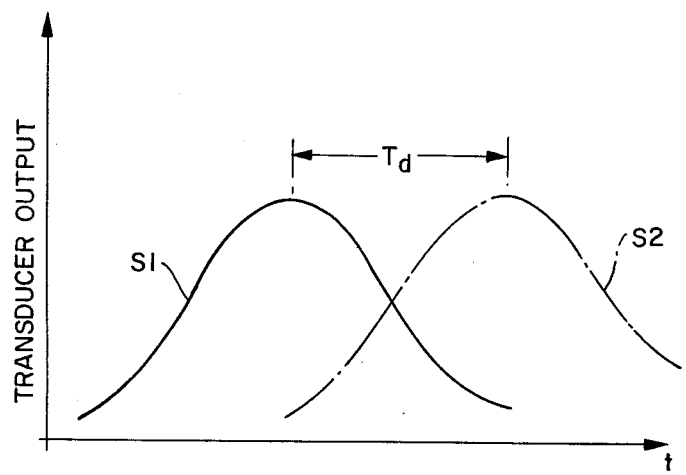
FIG. 9 is a time plot illustrating the relationship between the two signals derived from the interdigitated capacitor of FIG. 7.

A second method uses two interlaced or interdigitated capacitors to form one plate of the capacitive cell 20 such as shown in FIG. 7. The interlaced capacitive plate 16 is formed of leaves 12 and 14, and a high-frequency oscillation signal is applied to the capacitive cell 20 from excitation source 70, as before. Each of the two leaves of the interlaced capacitors generates virtually the same signal, except that the signals are displaced in time. The period of the displacement is proportional to the time of flight $T_d$ of particles through the capacitive cell.

Figure 11:
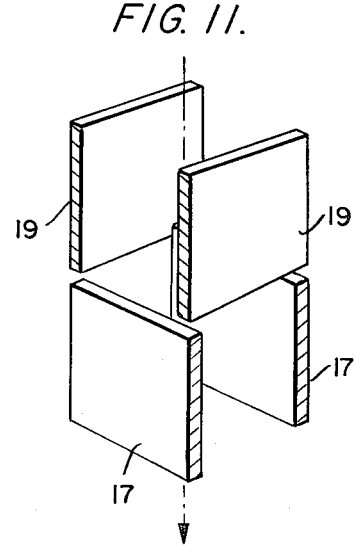
FIG. 11 is a perspective view of multiple discrete capacitors forming the capacitive measuring cell of the instant invention.

The signals from the two capacitor leaves are fed to correlator 57, shown in FIG. 11, which calculates the period of the displacement by generating an estimated delay by preset increments from a predetermined value, and calculating the correlation coefficient. This calculation is repeated for many different delays, and the delay which gives the highest correlation coefficient is taken as the most probable time of flight $T_d$. The weight of the substance is then calculated by the following formula:

$$Wt = A \int_{t=0}^{t=n} [\Delta C'(t) \Delta C''(t - t_d)/T_d]^{\frac{1}{2}} dt$$

where t=time, $T_d$ is the delay time between the two signals, $\Delta C'(t)$ is the change in capacitance of the first capacitor, $\Delta C''(t-t_d)$ is the change in capacitance of the second capacitor, and A is a conversion factor.

The signal representing the mean time of flight is fed into the calculating means 56; and the cross-correlated output is fed into delay means 52. The output of delay 52 is fed into data detecting means 54 and into calculating means 56, as described above in connection with FIG. 4. The mass of the substance is then computed, as described above.

If an irregularly-shaped object is placed in an ordinary parallel-plate capacitor 20, as shown in FIG. 1, the capacitance will, to some degree, be a function of the orientation of the object in the cell. If the cell in FIG. 1 were rotated about an axis parallel to the cell plates and passing through the center of the gap between the plates, and if the geometric mean of the data obtained during the rotation of the cell through 90° were calculated, this number would be proportional to the mass of the material, and independent of the attitude of the material. However, it is very difficult to rotate the cell 90° during the short time the object is in the cell.

Figure 10:
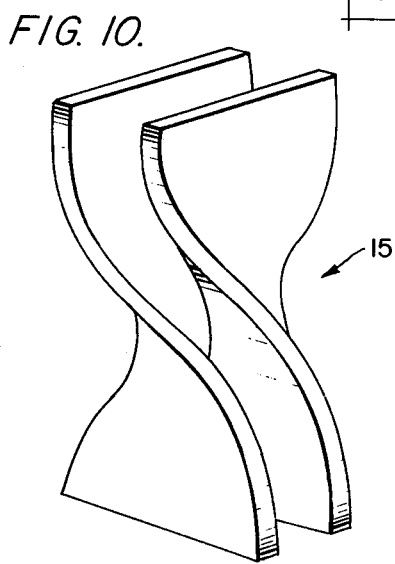
FIG. 10 is a perspective view of a capacitor formed in a 90° twist.

One device for overcoming this problem of the capacitance being a function of orientation is shown in FIG. 10 which illustrates a parallel-plate capacitor having its parallel plates twisted by 90°. When a solid object is dropped through such a twisted capacitive cell, the orientation of the object will not affect the reading of the change in capacitance of the capacitive cell. By passing the object through the twisted capacitor cell 15 shown in FIG. 10, the result will be equivalent to rotating the cell around the fixed object, as described above.

Another method of overcoming the above-described orientation problem is to use a bank of capacitors, each looking at the material at a different angle, as shown by the multiple capacitive cell illustrated in FIG. 11 wherein two capacitive cells 17 and 19 are arranged so that the lines defined by the edges of the plates at the entrance to the first cell make a 90° angle with the corresponding lines of the second cell; that is, there are two perpendicular capacitors. The effect of such an arrangement will be equivalent to rotating the cell around the fixed object, as described above. The partially corrected value may be obtained by calculating the geometric mean of the background peak height from each cell.

From the foregoing description, one skilled in the art can easily ascertain the essential characteristics of this invention and, without departing from the spirit and scope thereof, can make various changes and modifications of the invention to adapt it to various usages and conditions.

I claim:

1. Capacitive weighing apparatus comprising:
  (a) a capacitive sensing transducer comprising a measuring capacitor having a pair of spaced plates, said capacitive sensing transducer being responsive to the passage of a sample between said pair of spaced plates for generating a transducer output comprising a time-variable signal proportional to the instantaneous capacitance between said pair of spaced plates;
  (b) an excitation source for applying a driving signal to said transducer; and
  (c) calculating means responsive to said transducer for measuring the mass of a sample as it passes through said transducer, said calculating means comprising integrating means for generating a signal indicative of the integral of said time-variable signal over a predetermined interval of time.

2. Apparatus according to claim 1 wherein said calculating means further comprises correction means for providing a correction signal indicative of the magnitude of accumulation of particles of the sample on said plates.

3. Apparatus according to claim 2 wherein said correction signal is a function of the initial and final amplitudes of said transducer output for the period of integration by said integrating means.

4. Apparatus according to claim 3 wherein said calculating means further comprises subtraction means for obtaining a mass-indicating signal by subtracting said correction signal from said signal indicative of the integral of the time-variable signal.

5. Apparatus according to claim 2 further comprising data detecting means monitoring said transducer output for distinguishing between noise and a time-variable signal, and inhibiting said integrating means from operating on noise.

6. Apparatus according to claim 5 wherein said data detecting means comprises differentiation means for determining whether the rate of change of said transducer output signal exceeds a predetermined value.

7. Apparatus according to claim 6 wherein said differentiation means comprises a sample-and-hold circuit for sampling and holding values of the amplitude of said transducer output at predetermined intervals and a comparator circuit for comparing said values to determine whether the rate of change of the transducer output exceeds a predetermined value.

8. Apparatus according to claim 5 further comprising delay means responsive to said time-variable signal for generating a delayed signal that is substantially a replica of said time-variable signal, and wherein said data detecting means operates on the undelayed signal, and said integrating means operates on said delayed signal to generate said signal indicative of the integral of said time-variable signal.

9. Apparatus according to claim 8 wherein said delay means comprises a phase-linear filter.

10. Apparatus according to claim 9 wherein said phase-linear filter comprises a Bessel filter.

11. Apparatus according to claim 1 wherein said capacitive sensing transducer generates an output comprising a pair of time-variable signals which are identical except that one is delayed relative to the other, each time-variable signal being proportional to the instantaneous change in capacitance between said pair of spaced plates caused by the passage of a sample between said pair of spaced plates.

12. Apparatus according to claim 11 wherein one plate comprises two interdigitated, electrically isolated portions.

13. Apparatus according to claim 11 further comprising correlator means for generating a delay-magnitude signal indicative of the delay between said pair of time-variable signals, and providing said delay-magnitude signal to said calculating means.

14. Apparatus according to claim 13 wherein said calculating means further comprises correction means for providing a correction signal indicative of the magnitude of accumulation of particles of samples on said plates.

15. Apparatus according to claim 14 further comprising data detecting means monitoring said transducer output for distinguishing between noise and said time-variable signal, and inhibiting said integrating means from operating on noise.

16. Apparatus according to claim 15 further comprising delay means responsive to said time-variable signal for generating a delayed signal that is substantially a replica of said time-variable signal, and wherein said integrating means operates on said delayed signal in generating said signal indicative of the integral of said time-variable signal.

17. Apparatus according to claim 1 wherein said pair of spaced plates is formed in a substantially 90° twist.

18. Apparatus according to claim 1 wherein said capacitive sensing transducer comprises a plurality of pairs of spaced plates, each oriented at different angles with respect to the path travelled by the sample.

19. Apparatus according to claim 1 wherein the capacitive sensing transducer includes a reference capacitor, the calculating means being responsive to the difference between the output of the measuring capacitor and the output of the reference capacitor.

20. Apparatus according to claim 19 wherein said capacitive sensing transducer generates a transducer output comprising a time-variable signal proportional to the instantaneous difference between the capacitance of said measuring capacitor and the capacitance of said reference capacitor caused by the passage of a sample through said measuring capacitor.

21. Apparatus according to claim 20 wherein the sample is a powder, and said calculating means further comprises correction means for providing a correction signal representative of the magnitude of accumulation of particles of the sample on said plates.

22. Apparatus according to claim 21 further comprising data detecting means that monitors said transducer output for distinguishing between noise and said time-variable signal, and inhibiting said integrating means from operating on noise.

23. Apparatus according to claim 22 further comprising delay means for generating a delayed signal representative of said time-variable signal, and wherein said integrating means operates on said delayed signal in generating said signal representative of the integral of said time-variable signal.

24. Apparatus according to claim 23 further comprising synchronous detection means for extracting said time-variable signal from any noise occurring in said transducer output, said integrating means receiving said time-variable signal from said synchronous detection means.

25. Apparatus according to claim 24 wherein said synchronous detection means comprises a lock-in amplifier.

26. Apparatus according to claim 25 wherein said lock-in amplifier is a vectored heterodyning lock-in amplifier.

27. Apparatus according to claim 1 wherein the capacitive sensing transducer includes a reference capacitor, the calculating means being responsive to the difference between the output of the measuring capacitor and the output of the reference capacitor, and wherein said capacitive sensing transducer generates an output comprising a pair of time-variable signals which are identical except delayed, each time-variable signal being proportional to the instantaneous change in capacitance between said pair of spaced plates caused by the passage of the sample between said pair of spaced plates.

28. Apparatus according to claim 27 wherein one plate of said measuring capacitor comprises two interdigitated portions.

29. Apparatus according to claim 28 further comprising correlator means for generating a delay-magnitude signal indicative of the magnitude of the delay between said pair of time-variable signals, and providing said delay-magnitude signal to said calculating means.

30. Apparatus according to claim 1 wherein the capacitive sensing transducer includes a reference capacitor, the calculating means being responsive to the difference between the output of the measuring capacitor and the output of the reference capacitor, and wherein said measuring capacitor comprises a pair of spaced plates formed in a substantially 90° twist.

31. Apparatus according to claim 1 wherein the capacitive sensing transducer includes a reference capacitor, the calculating means being responsive to the difference between the output of the measuring capacitor and the output of the reference capacitor, and wherein said measuring capacitor comprises a plurality of pairs of spaced plates, each oriented at different angles with respect to the path travelled by the sample.

32. A method of capacitive weighing, comprising the steps of:
   (a) passing a sample through a capacitive sensing transducer for generating a time-variable signal; and
   (b) integrating the time-variable signal for obtaining a signal representative of the mass of the sample.

33. The method of claim 32 comprising the further steps of:
   (a) generating a baseline correction signal representative of the amount of accumulation of particles of samples in the capacitive sensing transducer; and
   (b) subtracting the baseline correction signal from the signal representative of the mass of the sample to obtain a refined signal representative of the mass of the sample.

34. The method of claim 33 wherein the baseline correction signal is obtained by integrating the baseline of the time-variable signal over the same limits over which the time-variable signal is integrated.

35. In a capacitive weighing device having a capacitive sensing transducer comprising a pair of spaced plates for generating a transducer output comprising a time-variable signal proportional to the instantaneous change in capacitance between said pair of spaced plates caused by the passage between said pair of spaced plates of a bounded sample having a predetermined attitude; the improvement comprising obtaining a representation of the mass of said bounded sample by determining the peak value of a said time-variable signal caused by the passage of said bounded sample between said pair of spaced plates.

36. The improvement of claim 35 wherein said peak value is determined by sampling and holding values of the amplitude of said transducer output at predetermined intervals and comparing successive values to determine when the peak value has occurred.

37. The device as recited in claim 1 or 2 further comprising means for determining the mean time of flight for said sample to pass through said transducer.

38. The device as recited in claim 37 wherein said means for determining said mean time of flight comprises a detecting capacitor disposed below said capacitive sensing transducer for determining when the leading edge of said sample leaves said transducer.

* * * * *